United States Patent [19]
Neely

[11] Patent Number: 5,767,857
[45] Date of Patent: Jun. 16, 1998

[54] METHOD, APPARATUS, AND SOFTWARE PRODUCT FOR GENERATING OUTLINES FOR RASTER-BASED RENDERED IMAGES

[75] Inventor: Shawn R. Neely, Sunnyvale, Calif.

[73] Assignee: Pacific Data Images, Inc., Palo Alto, Calif.

[21] Appl. No.: 705,703

[22] Filed: Aug. 30, 1996

[51] Int. Cl.$^6$ .................................................. G06T 17/50
[52] U.S. Cl. .......................................................... 345/427
[58] Field of Search .................................. 345/418, 419, 345/423, 424, 425, 427, 428, 429

[56] References Cited

U.S. PATENT DOCUMENTS

| | | | |
|---|---|---|---|
| 5,426,723 | 6/1995 | Horsley | 345/428 |
| 5,557,691 | 9/1996 | Izuta | 345/428 X |
| 5,615,319 | 3/1997 | Metzger et al. | 345/427 |
| 5,649,081 | 7/1997 | Nakajima et al. | 345/427 X |
| 5,673,376 | 9/1997 | Ray et al. | 345/427 |

OTHER PUBLICATIONS

"Traditional Cel Animation Look with 3D Renderers", SIGGRAPH '96, 23rd International Conference on Computer Graphics and Interactive Techniques, New Orleans, Louisana, Aug. 1996.
Russ, John C., "The Image Processing Handbook" Second Edition, pp. 387–394, Raleigh, North Carolina, 1994.

Primary Examiner—Phu K. Nguyen
Assistant Examiner—Cliff N. Vo
Attorney, Agent, or Firm—Fenwick & West LLP

[57] ABSTRACT

A method apparatus, and software product generates raster-based complete outlines of raster-based rendered images based on 3D models. Preliminary outlines of a rendered image are created from the subregion identifiers, position data, and orientation data from the rendered image database. These preliminary outlines are then combined and refined to generate the final image outline. Subregion identifiers identify various subregions or materials in the image. Position data describes a distance between a pixel and a reference point. The orientation data describes the orientation of the underlying models at each pixel in the image. In one embodiment, orientation data describes variations in orientation at a given pixel with respect to some number of nearby pixels.

25 Claims, 17 Drawing Sheets

METHOD, APPARATUS, AND SOFTWARE PRODUCT FOR GENERATING OUTLINES FOR RASTER-BASED RENDERED IMAGES

BACKGROUND

1. Field of the Invention

The present invention relates generally to methods, apparati, and software products for processing images, and more particularly to computer implemented methods and software products for generating an outline of a computer rendered image of a three dimensional model.

2. Description of the Background Art

A familiar style in cartoon cel animation is the use of outlined shapes of figures and flat colors within the borders of outlines. Historically, these figures outlines are drawn by hand. This process can be tedious and resource intensive (in terms of human labor and materials), and the output can be difficult to revise.

Computer graphics technology has helped to accelerate the drawing, editing, and production process for cartoon and other animation, by making it easier to create and edit cel images and preview animated segments. One of the most powerful applications of computers to animation has been the development of methods and systems for generating images from three-dimensional (3D) models of characters, props, or scenes. The images are typically generated by a "renderer," which may be implemented as a combination of software and hardware, the latter being either a dedicated or general purpose computer. Computer renderers can create images having realistic lighting, shading, perspective, texture, and other visual attributes. For use in animation, renderers typically output a raster-based image, comprised of an array of pixel elements, with each pixel element defined by some number of bytes of color data (e.g., RGB), along with other useful data.

However, a problem with using computer-rendered images directly for cartoon animation is that these images do not simulate the desired cartoon style: Figures or objects in computer-rendered images are not outlined, and surfaces on the image are shaded to indicate changes in depth and the position and intensity of the light source. In particular, such images intentionally do not have outlines that would be present if the image were drawn by hand. If the hand-drawn style is then desired, some additional image processing must be applied to generate the outlines for the image.

Two techniques known to practitioners of computer graphics are employed to generate the outline for a raster-based rendered image. One technique utilizes subregion identifier data from the rendered image to create outlines of the subregions. Subregion identifiers are numerical values that denote a single area of the image having a common, constant color, texture, or the like, throughout the area. Each rendered image is made up of numerous subregions, analogous to a "paint by numbers" type of image. For example, in a simple image of an animal's face, the eyes, nose, mouth, fur, and whiskers could each be a subregion having a unique subregion identifier, which would apply to all pixels in their respective subregions. This subregion identifier data is rendered into the image's array of pixels, and an outline is created by drawing lines between distinct subregions in this rendering. A problem with this technique is that the generated outline is often incomplete. This technique misses outlines where there are discontinuities in a single subregion, such as a fold, seam, or edge that would be visually apparent in the rendered image, but are not "numerically" present since the subregion data is the same on both "sides" of the fold. This technique also misses outlines where there are overlaps (at different depths) of surfaces with the same subregion identifier, for example, where one part of the subregion is closer to the camera than some other part. In a hand-drawn image, these parts of a same subregion would likely be separated by an outline, yet this technique cannot produce an outline of these parts of an image. As a result, this technique fails to satisfactorily reproduce the hand-drawn outlined cartoon style.

Another technique for generating outlines utilizes position data from the rendered image. Every point that makes up the image has a distinct position in lo space, from which its distance to the camera or other reference points can be measured. In this second technique, the image is rendered so that this position data is encoded in the image's array of pixels. In this output, outlines are generated where there are sharp changes in positions between points (e.g., distance from the point of view), and an outline is created when lines are drawn on regional borders. This technique, however, has its deficiencies in that it often cannot create outlines where there are edges, creases, or folds on a region. For example, a fold or edge in a region will not be detected if there are only gradual changes in position on either side of the fold. This technique also cannot create outlines on surfaces where there is a change in subregion identifier but no sharp changes in the positions of the subregions.

Even when combining outlines generated from the existing techniques described above, edges, creases, and folds within a subregion still are not detected. Thus, even the combination of outlines from these two different techniques fails to produce satisfactory outlines as in the hand-drawn cartoon style.

Because these various techniques, whether used alone or in combination, typically result in incomplete outlines, it is normally necessary for the cartoon designer to manually add the missing outlines to the image. This process is time consuming and thereby can considerably add to the cost of the cartoon animation, and the time taken to complete it. Thus, there is a need for an improved method for generating outlines that overcomes the disadvantages of the conventional techniques and that automatically generates complete outlines from raster-based rendered images. Because the problem of generating outlines is commonly experienced in the computer animation industry, it is desirable to provide a software product that can be applied directly to the raster-based rendered image data to generate the outlines as a post-rendering operation, without the need to specially modify existing renderers.

SUMMARY OF THE INVENTION

In accordance with the present invention, methods, apparati, and software products are provided to generate the outline for a raster-based rendered image. The present invention is used in conjunction with a digital computer with graphics display to render and show the image, to generate three preliminary outlines of the rendered image from data retrieved from the image, to combine the preliminary outlines into a combined outline, and to refine the combined outline. The final raster-based outline image may be displayed and stored in a database. The present invention allows the designer to control and monitor the entire outline generation process.

In one embodiment of the present invention, three preliminary outlines are generated and combined. One preliminary outline is generated from the subregion identifier information stored in a database containing rendered image data. A map of the image encoded with subregion identifier data is created, which indicates changes between the various subregions of the image. From this map a preliminary outline is generated.

A second preliminary outline is based on position information also stored in the rendered image database, and a preliminary outline is generated from a position map of the image with this data encoded into it. The position map indicates changes in the position of pixels in the image relative to some reference point or point of view.

A third preliminary is generated based on discrete changes in orientation in the image. This third preliminary outline is generated from an orientation data map that is produced by rendering orientation data into the pixel array of the image. Local differences in the orientation of pixels are computed from the orientation data map to create the third preliminary outline, an orientation change outline. This orientation change preliminary outline may also be created directly from the underlying orientation data by determining changes in orientation of the underlying model data. Alternatively, the orientation change outline may be derived from the orientation data map using edge detection techniques.

In one embodiment, the orientation data rendered into the orientation data map, and used to generate the orientation change preliminary outline is surface normal vector data describing the surface normal vector at each pixel in the image. Local orientation differences may then be based on various computed differences in neighboring surface normal vectors.

The three preliminary outlines are combined to generate a combined, complete outline for the rendered image. The designer may then beneficially control the thickness, contrast, and color of the combined outline. The resulting final outline can be used immediately for cartoon animation purposes, and possess the desired look of the hand-drawn cartoon style.

In one embodiment of the present invention, there is provided various modules of a software product that control the operation of a computer to generate and combine the preliminary outlines. One embodiment of the software product employs separate modules or routines for generating the first, second, and third preliminary outlines, and for combining the outlines. The software product is storable on a computer readable medium for use with a conventional computer and processor.

The present invention thereby provides a method and software product that can be applied to raster—based rendered images to produce outlines thereof suitable for use in cartoon animation. The present invention thus extends the benefits of computer based animation—the accurate generation, storing, and control of complex 3D models—to the domain of cartoon animation having particularly desirable and appealing visual characteristics, through a substantially automated and economical process.

DETAILED DESCRIPTION OF THE INVENTION

Figure 1:
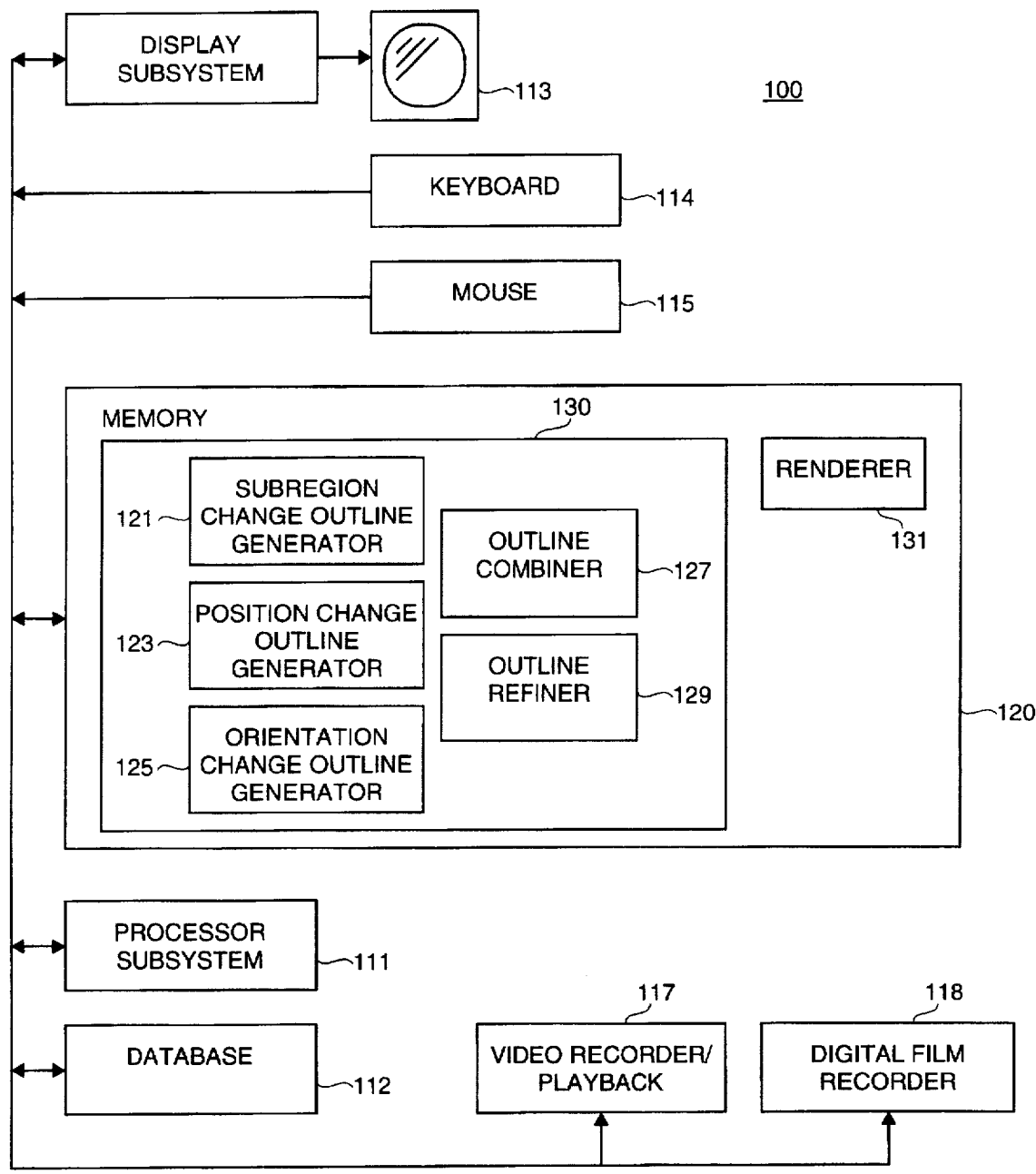
FIG. 1 is a block diagram of an apparatus in accordance with an embodiment of the invention, and which can be used to practice the method of the present invention.

Referring to FIG. 1 there is shown a block diagram of an apparatus 100 in accordance with one embodiment of the present invention, and which can be used to practice the method of the present invention. Apparatus 100 comprises a computer system including a processor 111, a memory 120, input devices such as a mouse 115 and keyboard 114, and output devices such as a raster display 113, and optionally video recorder 117, digital film recorder 118, and the like for recording completed animations. The processor 111 and overall apparatus 100 operates under the control of software installed in memory 120. The display lo device 113 is used to monitor input and control of the process, and to view rendered images and outlines. Database storage 112 stores data for generating images, including 3D modeling data.

Memory 120 includes a software product 130 for producing outlines for rendered images in accordance with one embodiment of the present invention. In one embodiment, the software product 130 includes subregion change outline generator 121, a position change outline generator 123, an orientation change outline generator 125, an outline combiner 127, and an outline refiner 129. These various elements of the software product 130 variously configure and control the processor 111 to operate in accordance with the method of the present invention. The software product 130, or any elements thereof, may be supplied to the apparatus 100 on CD-ROM, diskette, or any other computer-readable media, for installation and execution thereon. The memory 120 may also include conventional software, such as a 3D renderer 131 for rendering images and associated data. The renderer 131 may be conventional, or in an alternate embodiment, may be modified to incorporate the elements of software product 130 itself. The computer system and apparatus may be implemented on a conventional Silicon Graphics workstation, executing a software product 130 in accordance with the present invention, or any other combination of software or hardware that performs the method of the present invention. It is understood by those of skill in the art of software engineering that the method of the present invention may be implemented in various configurations of a software product having elements different from those identified above.

Figure 2:
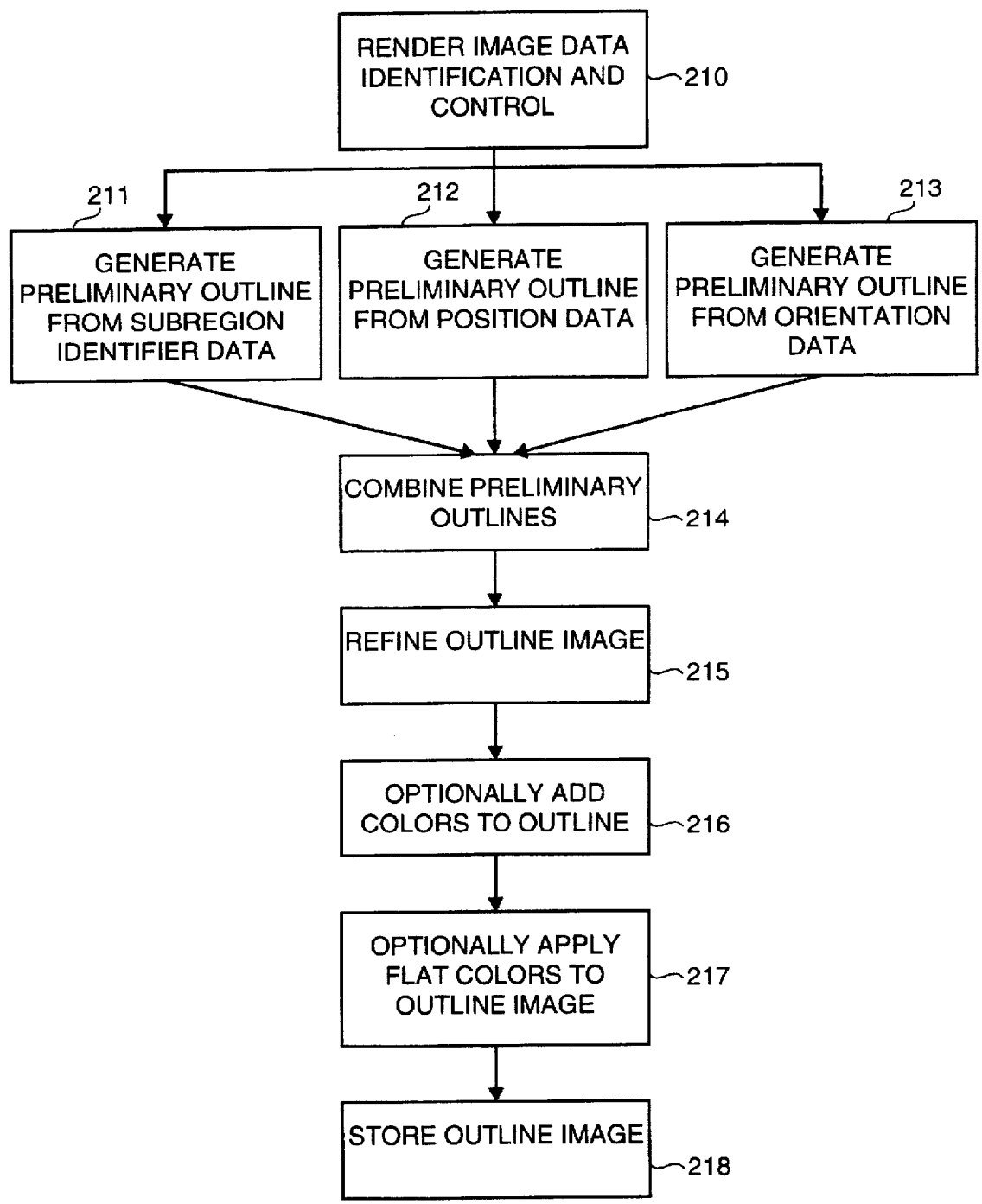
FIG. 2 is a flow diagram for a generalized procedure for generating the outline in accordance with the present invention.

Referring now to FIG. 2 there is shown a generalized flow diagram of a procedure for generating an outline of a raster-based image in accordance with an embodiment of the invention. The image is first rendered 210, using conventional rendering software 131. The present embodiment of the invention uses a scan-line type renderer. It should be understood, however, that in alternative embodiments of this invention other types of renderers may be used. In addition to rendering the image, the cartoon designer also specifies where the image outline output is to be stored 210 in the database 112, and the characteristics for the rendered image.

From the rendered image, the software product 130 generates preliminary outlines of the image, using values from the rendered image and underlying 3D models stored in the database 112. The order in which the preliminary outlines are generated is not material or limited by the invention, and may be altered as needed. The subregion change outline generator 121 generates 211 a preliminary outline using subregion identifier data. The position change outline generator 123 generates 212 another preliminary outline using position data. The orientation change outline generator 125 uses orientation data to generate 213 a third preliminary outline. The outline combiner 127 combines 214 the three preliminary outlines to produce a combined outline for the rendered image. The outline refiner 129 refines 215 the combined outline to produce a precise and smooth final outline of the rendered image. Optional enhancements may also be applied to use different colors 216 in the outline and to fill 217 the outline figures with flat colors. Lastly, the final outline image is stored 218 in the database 112.

Typically the completed image is output to the display 113 for review, and ultimately recorded on videotape or film for presentation. It will be understood that variations of this procedure can be employed, consistent with the principles of the invention, depending upon the properties of the rendered image and designer preferences for the outline output.

Figure 3:
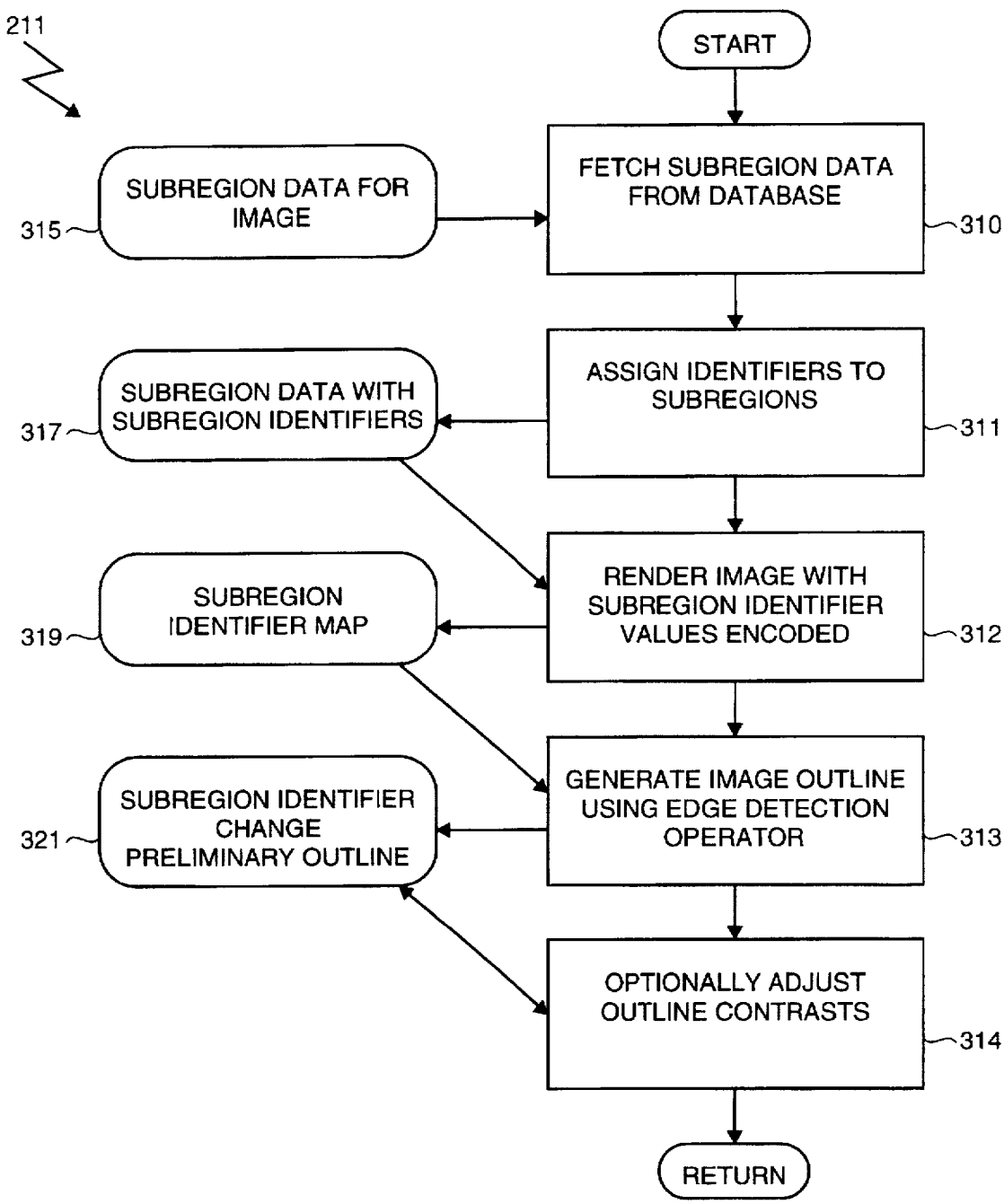
FIG. 3 is a flow diagram of a routine for generating a preliminary outline using subregion identifier data from the rendered image.

Referring now to FIG. 3 there is shown a flow diagram for generating 211 a preliminary outline from subregion data, as may be performed by the subregion change outline generator 121. The previously stored subregion data 315 from the rendered image is retrieved 310 from the database 112. By suitable manipulations such as encoding subregions as distinct gray values or colors, subregion data may be output by most commercial renderers, and thus this data is available for use in the present invention.

The cartoon designer assigns 311 property, or subregion identifiers to these subregions. The designer has control over the level of detail in which the identifiers are assigned—in extreme cases, for example, a unique identifier may be used for each subregion, or the same identifier may be used for several different subregions. Alternatively, the subregion identifiers may be automatically assigned using various characteristics of the image.

The subregion identifier values, encoded as distinct gray values or colors, are rendered 312 in the image's array of pixels to create a subregion identifier map 319 of the image. When viewed on the display 113, this map 319 is a two-dimensional representation of the rendered image, divided by areas with different subregion identifier values. For example, the subregion identifier map of an image of an eye could be divided into three distinct subregions, each a different shade of gray, to represent the pupil, iris, and white area of the eye.

Conventional edge-detection processing 313 is applied to the subregion identifier map 319 to create the preliminary outline 321 based on changes in the image subregions (edge-detection processing techniques are well covered by the literature—for examples, see Pratt, *Digital Image Processing*, John Wiley & Sons, Inc., 1978). Conventional contrast-enhancement processing (for examples of contrast-enhancement algorithms, see Pratt, *Digital Image Processing*) may be optionally applied to this output to balance the line shades. A preliminary raster-based outline 321 of changes in subregion identifiers of the rendered image is generated when this routine is completed.

Figure 8A:
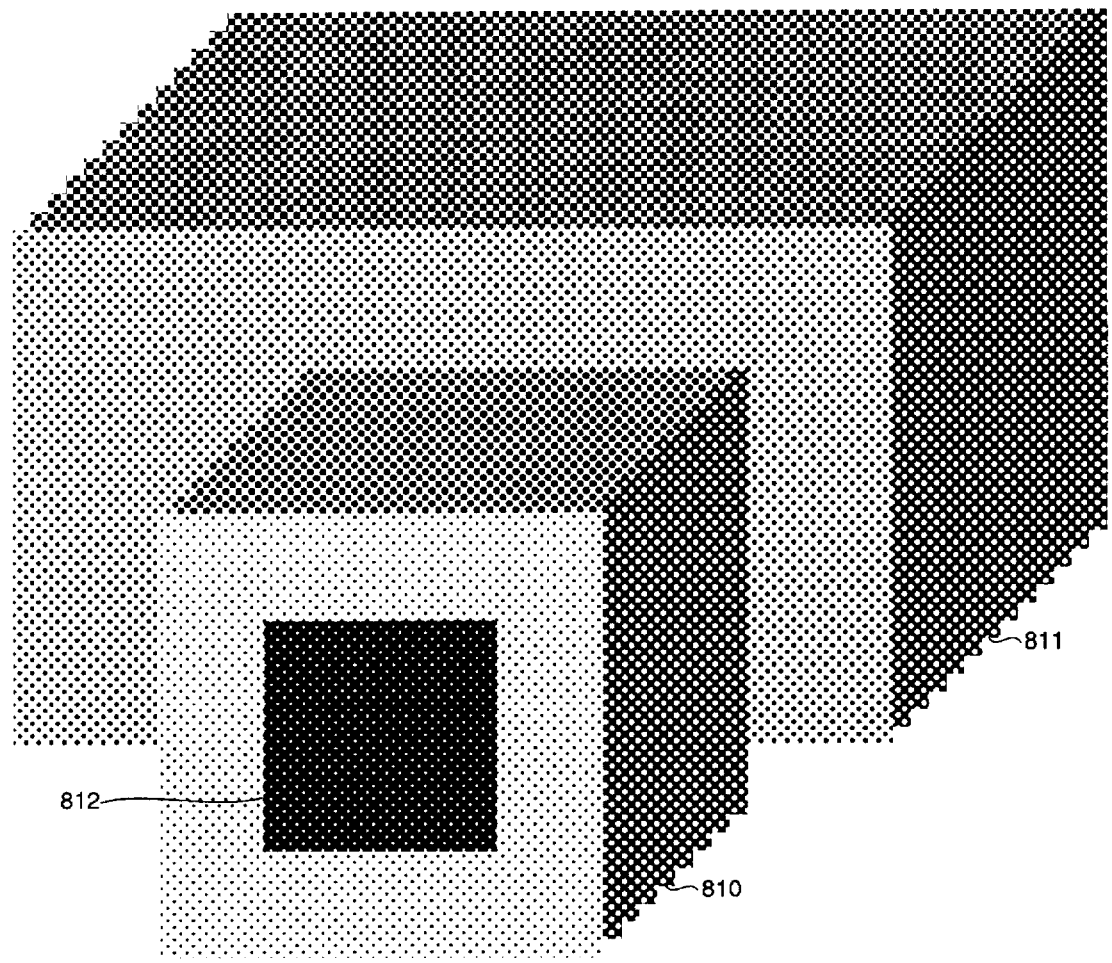
FIG. 8A is a sample raster-based rendered image.
Figure 8B:
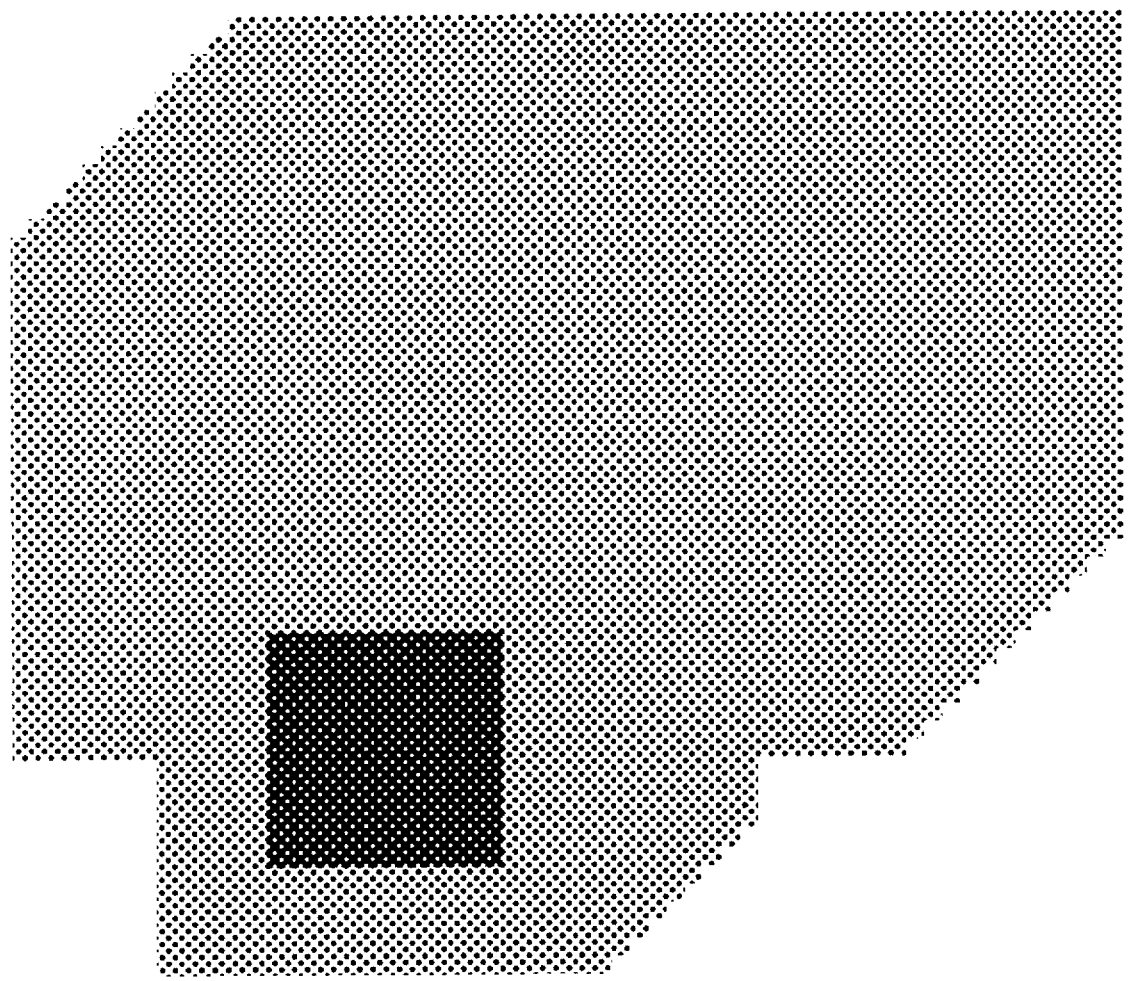
FIG. 8B is a subregion identifier map derived from the image of FIG. 8A.
Figure 8C:
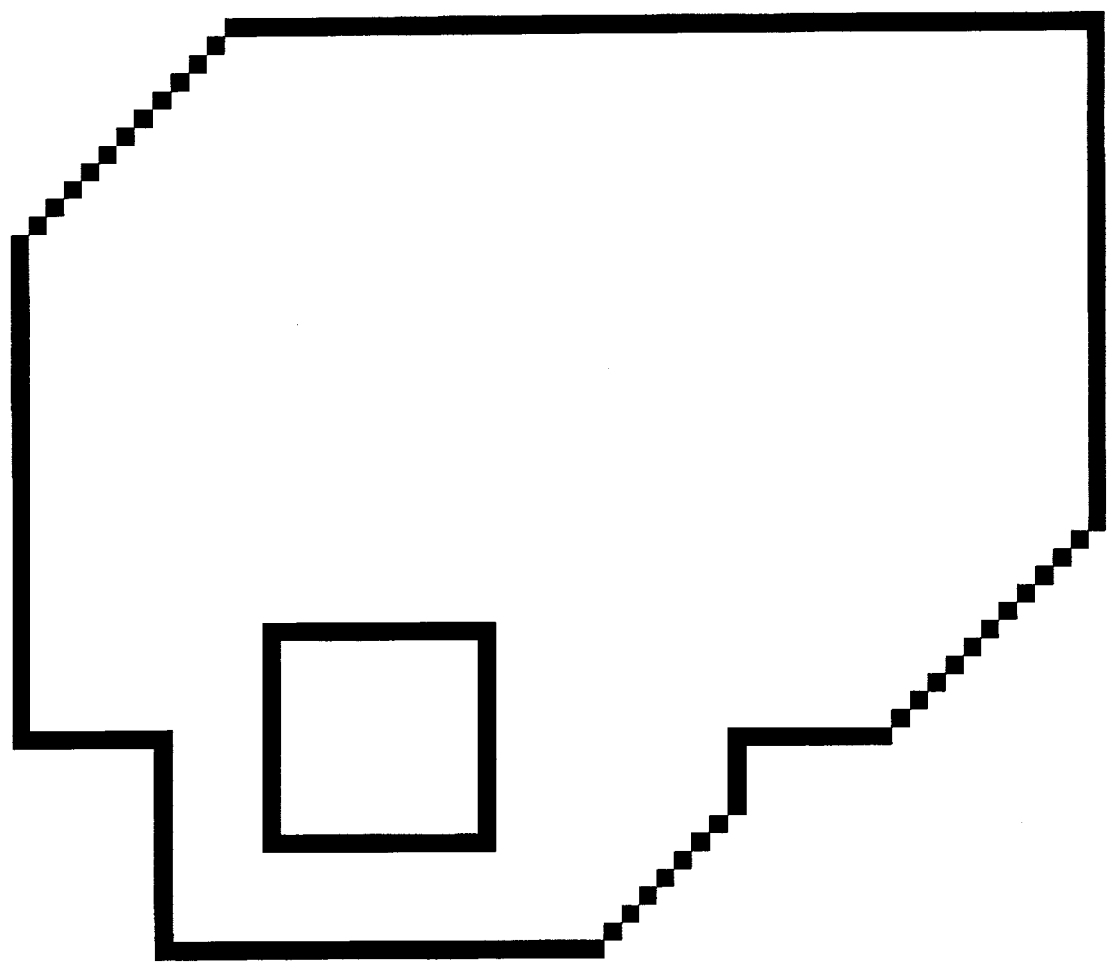
FIG. 8C is a preliminary outline based on this subregion identifier map.

FIGS. 8A–8C are simple examples illustrating this routine. FIG. 8A is a rendered image of two boxes 810 and 811, both of which are comprised of the same smooth opaque material on all sides (and hence having the same subregion identifier), except for subregion 812, where there is a patch of a darker material, which has a distinct subregion identifier. There are no discrete outlines present in the image, rather object edges are visually apparent only from changes in the pixel distribution. When subregion identifier data, represented as gray scale data, is rendered into the image of FIG. 8A, the result is subregion identifier map illustrated in FIG. 8B. FIG. 8C is the generated (using edge-detection processing) and contrast-adjusted outline 321 of the subregion identifier map of FIG. 8B, and shows where there are subregion identifier changes in the image of FIG. 8B between the two distinct subregions.

Figure 4:
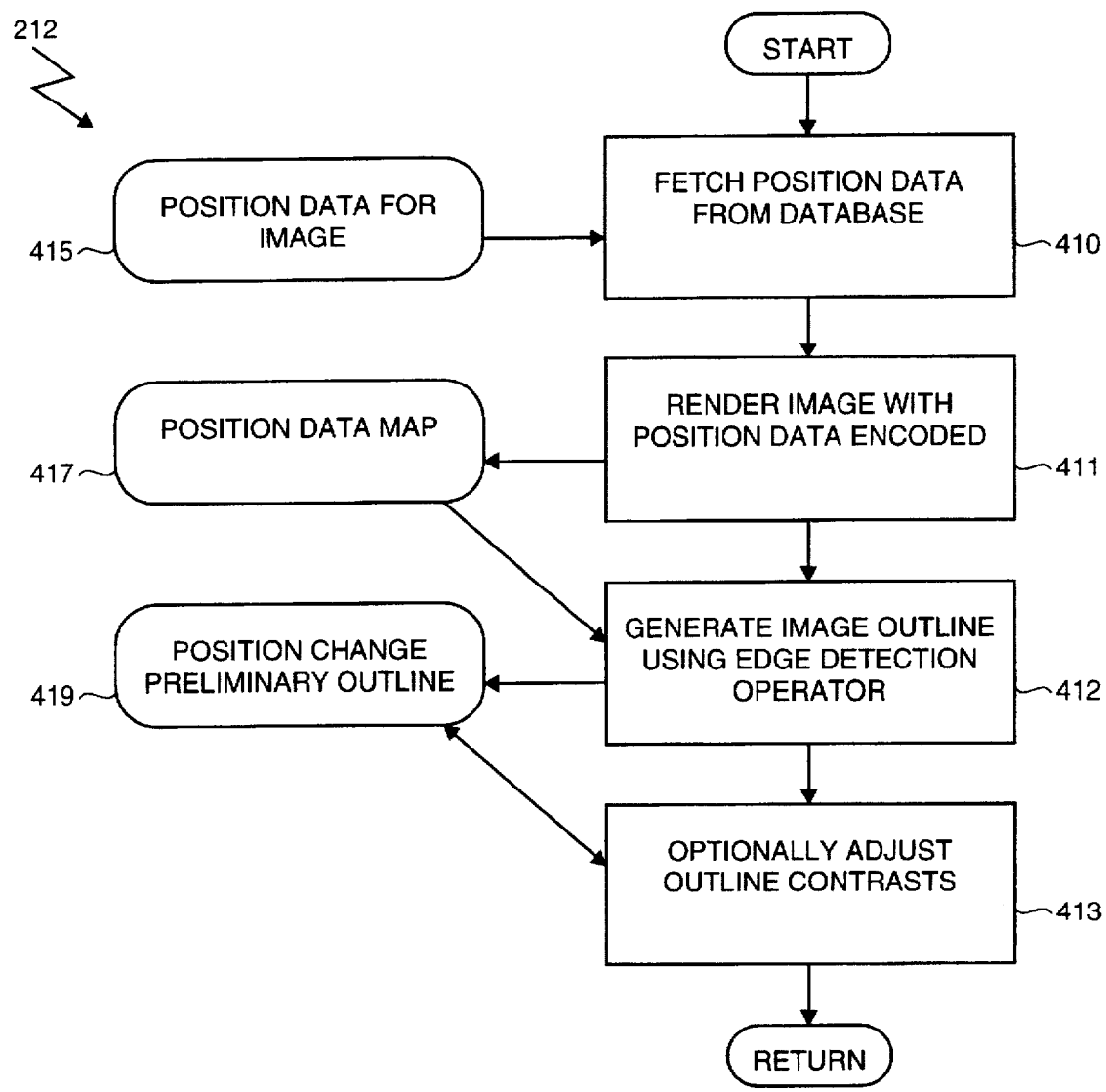
FIG. 4 is a flow diagram of a routine for generating a preliminary outline using position data from the rendered image.

Referring now to FIG. 4 there is shown a flow diagram for generating 212 a preliminary outline from position data, as may be performed by the position change outline generator 121. The previously stored rendered image position data 415 is retrieved 410 from the database 112. Again, this data is conventionally available from most renderers 131.

The position data is rendered 411 into the image's array of pixels to create a position map 417 of the image. The position map 417 describes the distance of each pixel from a predetermined point of view for rendering the image. Conventional edge-detection processing 412 is applied to this output to locate where there are sharp changes in position between regions in order to generate a preliminary outline of the regions based on their distance to the camera. Conventional contrast-enhancement processing 413 may be optionally applied to the preliminary position change outline 419 to balance the line shades between regions. A preliminary raster-based position change outline 419 that marks discrete position changes in the rendered image is generated when this routine is completed.

Figure 8D:
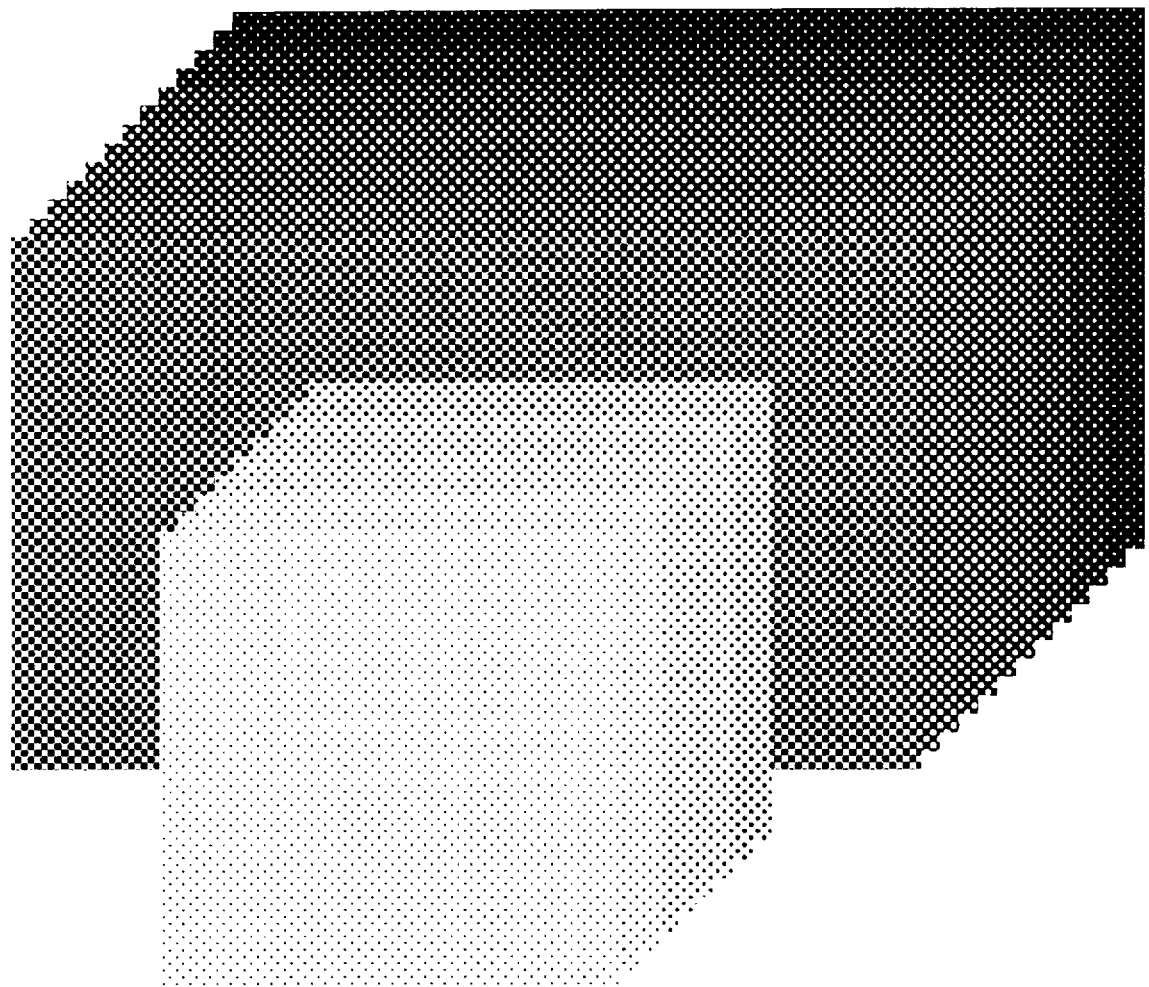
FIG. 8D is a position map derived from the image of FIG. 8A.
Figure 8E:
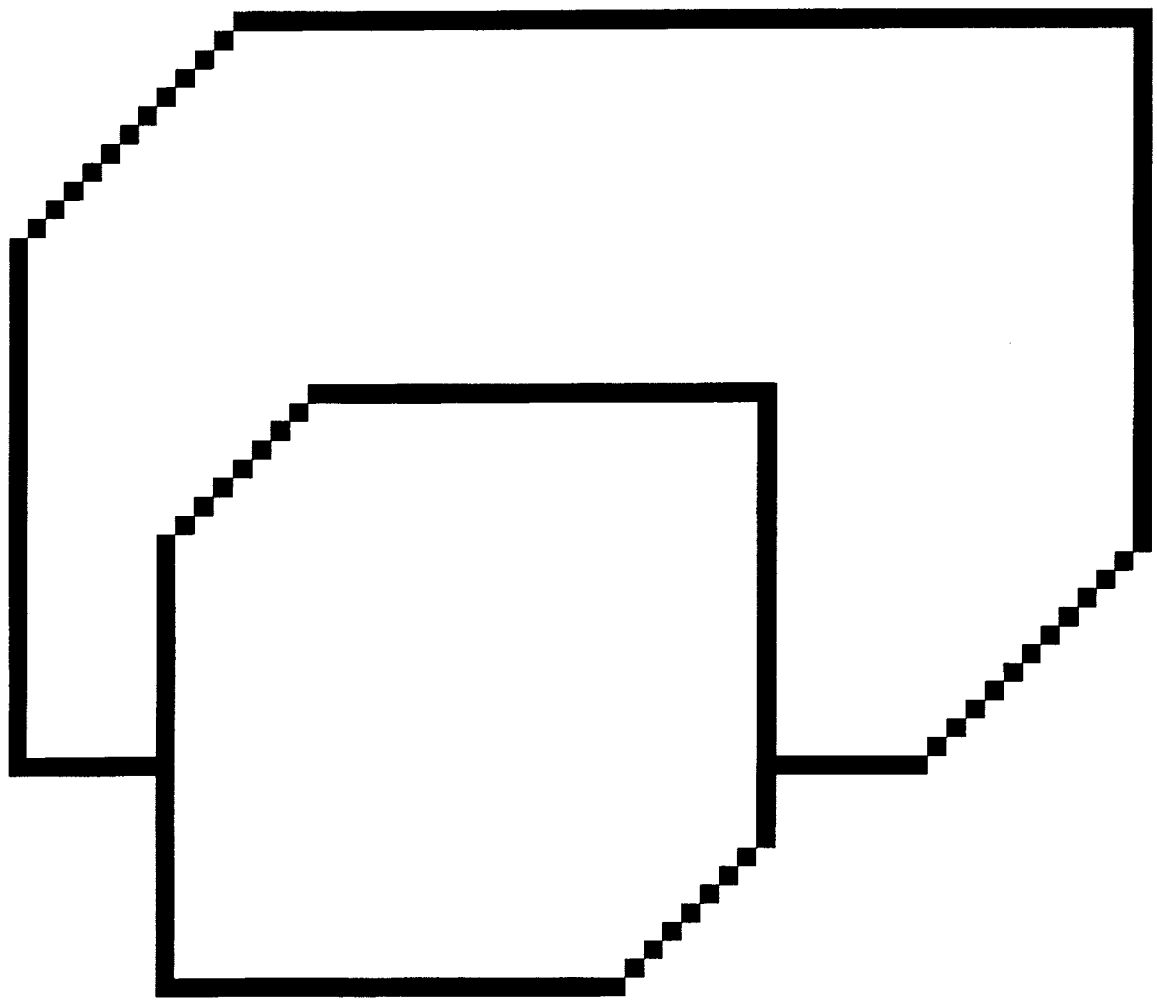
FIG. 8E is a preliminary outline based on this position map.

FIGS. 8A, 8D and 8E are simple examples illustrating this routine. FIG. 8D is the rendered position map of the image of FIG. 8A, showing by increasing gray scale value the distance from the camera of a portion of the image. FIG. 8E is the generated (using edge-detection processing) and contrast-adjusted outline 419 of the image of FIG. 8D, and shows where there are sharp position changes in the image of FIG. 8B, as between boxes 810 and 811, and along the edges of the boxes.

In the preferred embodiment of this process, the position change outline 419 is created 411 using a depth map of the rendered image. A depth map is created by calculating the distance from each point on the image to the camera, and rendering these values into the image's array of pixels. When viewed on the display device, the depth map is a gray-scale representation of the rendered image, with shades of gray indicating the distances between the camera and points on the image. FIG. 8D is an illustration of such a depth map. Alternative embodiments can be employed, such as using a position-encoded map of the image. A position-encoded map is generated by transforming a point's coordinate (x,y,z) value to a corresponding RGB triplet (some scaling of the RGB value may be necessary after the (x,y,z) transformation to accommodate the color value limits of the processor subsystem and database). When viewed on the display device, the position-encoded map is a color representation of the rendered image, with an RGB color indicating a point's position in space. The position change outline 419 is generated 411 from either of these encodings of the position map 417, using edge-detection techniques.

Figure 5A:
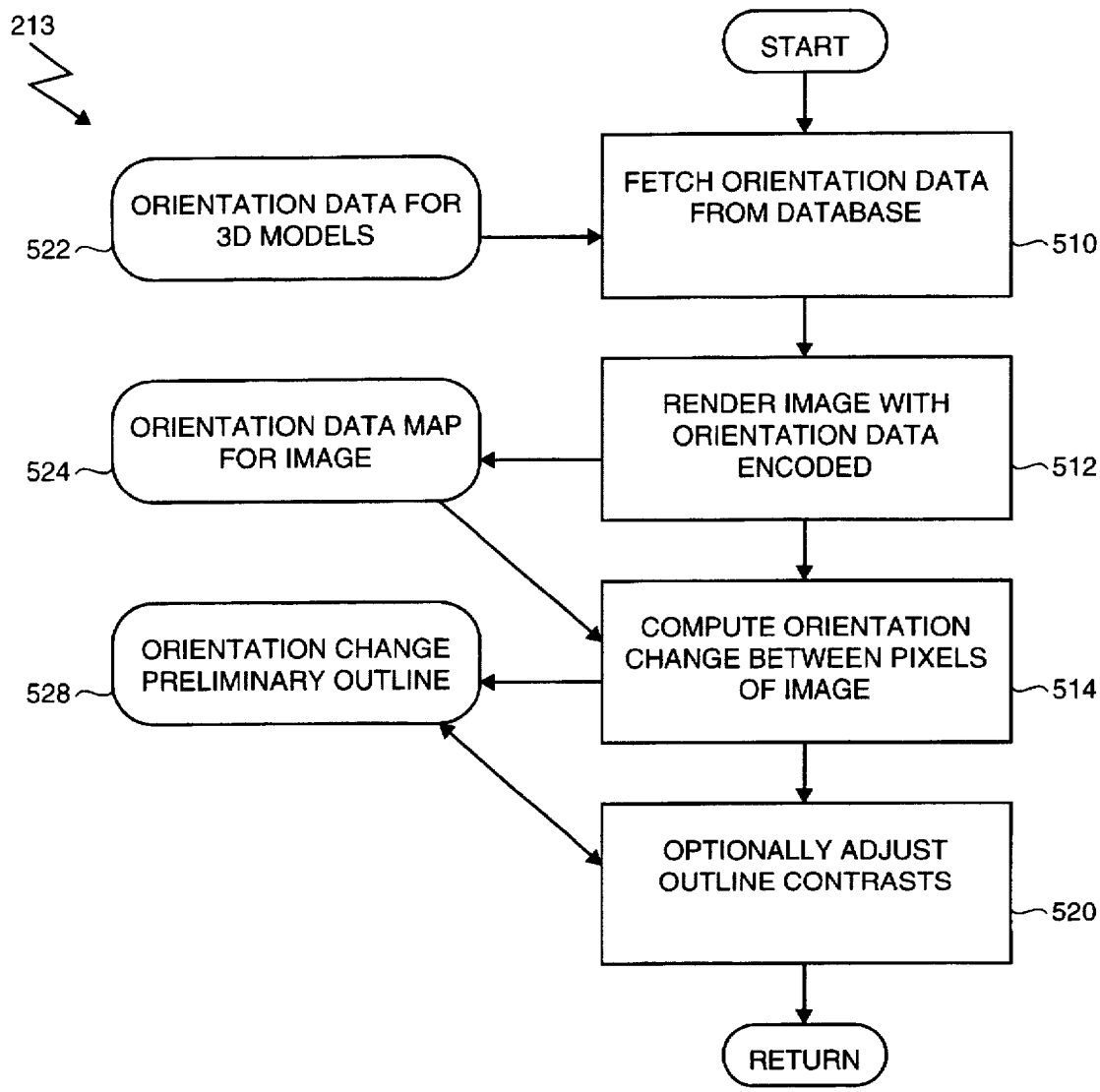
FIG. 5A is a flow diagram of one embodiment of a routine for generating a preliminary outline using orientation data from the rendered image.

Referring now to FIG. 5A there is shown a flow diagram of one embodiment of a method for generating 213 a preliminary outline based on orientation change, as may be performed by the orientation change outline generator 125. The previously stored orientation data for the 3D models in the image is retrieved 510 from the database 112. This orientation data 522 is in the form of unit surface normal vectors, or other data descriptive of the orientation of the underlying models that are rendered in the image at the projection plane. Orientation data is used by most renderers typically to compute lighting and shading. The orientation data for the model is rendered 512 into the image's array of pixels to create an orientation data map 524 of the image. The orientation change preliminary outline 528 for the image is calculated 514 from the orientation data map 524 by determining a magnitude of the change in orientation at each pixel in the image. Conventional contrast-enhancement processing 520 may be optionally applied to this output to balance the line shades. A preliminary raster-based outline 528 that marks discrete orientation changes in the rendered image is generated when this routine is completed.

Figure 8F:
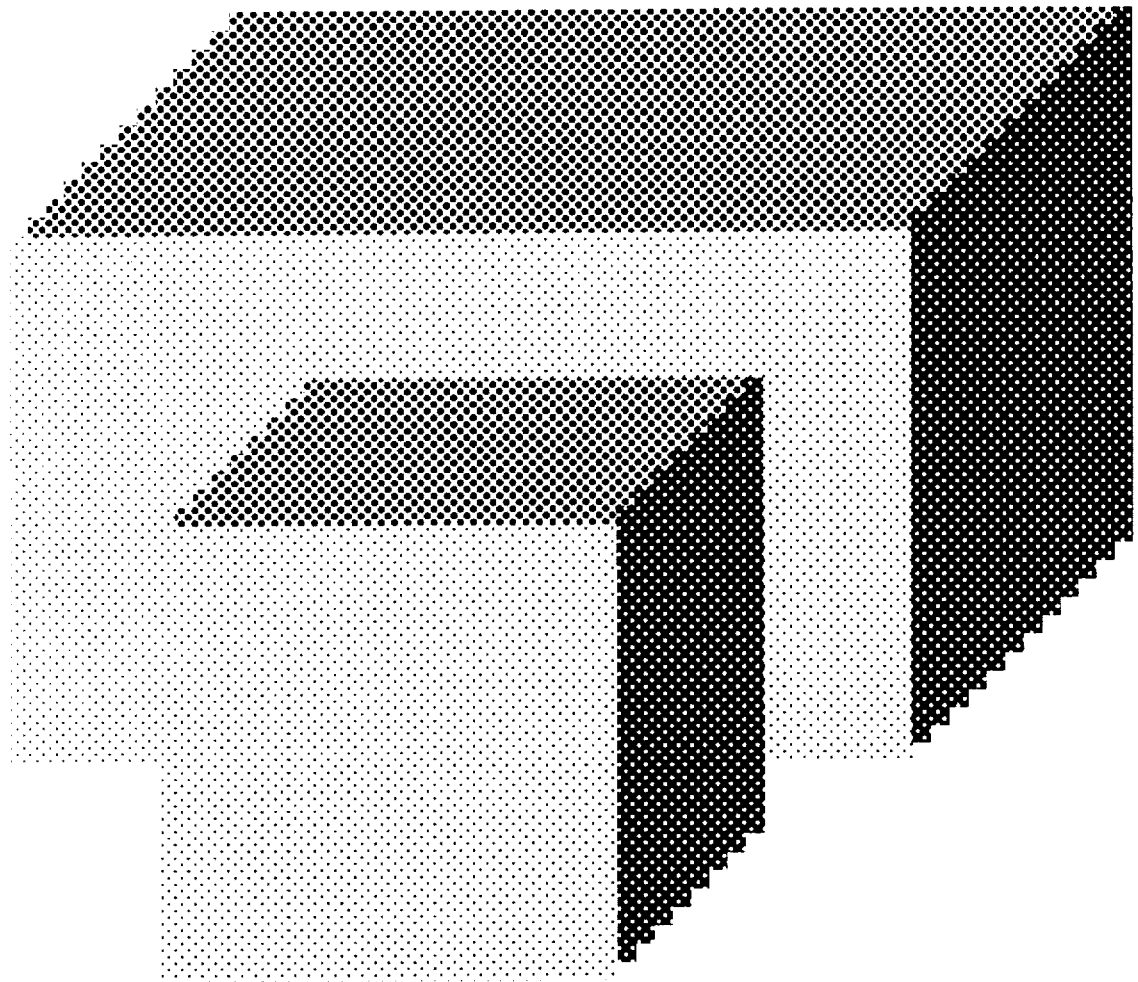
FIG. 8F is an orientation data map derived from the image of FIG. 8A.
Figure 8G:
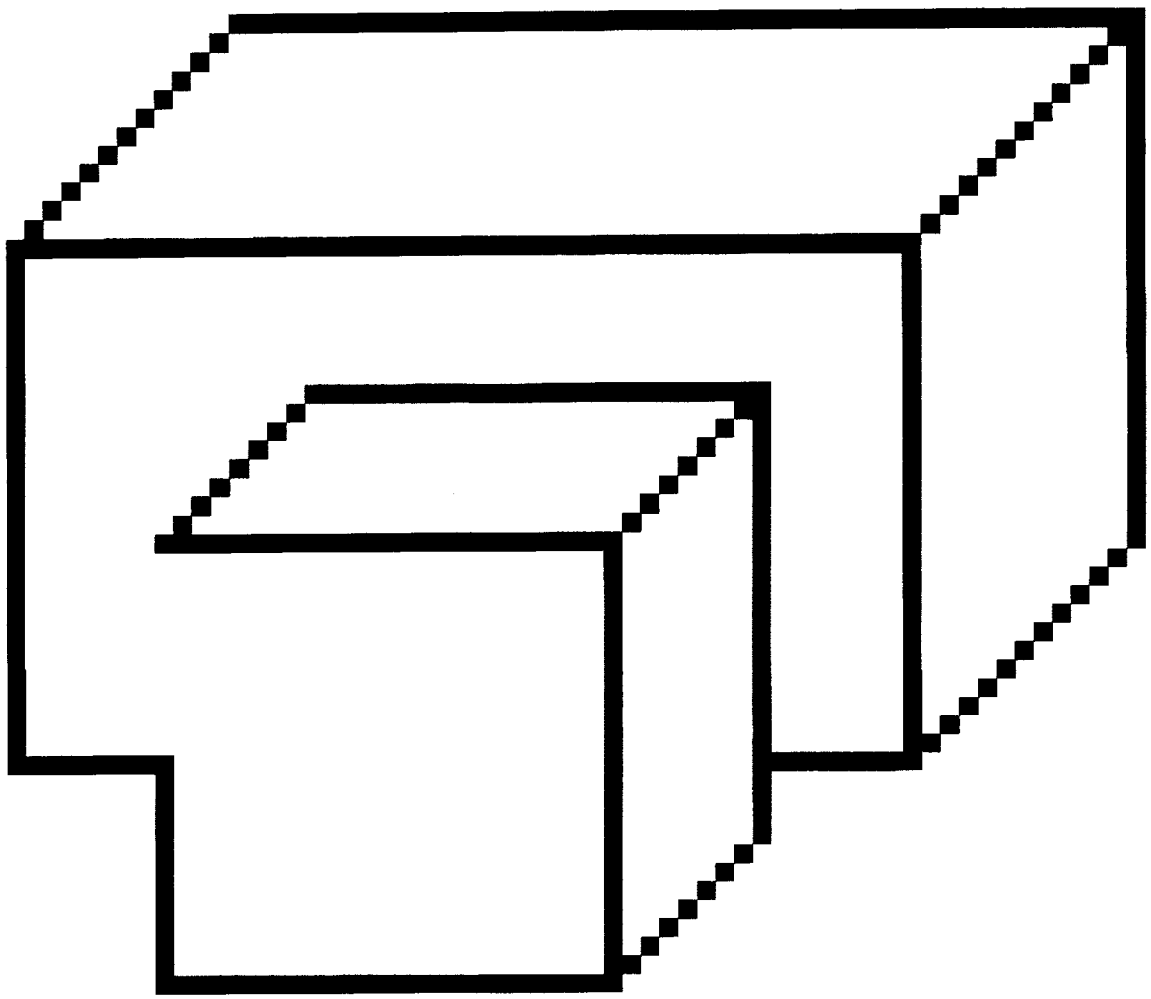
FIG. 8G is a preliminary outline based on this orientation data map.

FIGS. 8A, 8F, and 8G are simple examples illustrating this routine. FIG. 8F is a gray-scale representation of the rendered orientation data map (this image is usually in color) of the image of FIG. 8A. FIG. 8G is the orientation change preliminary outline 528 calculated from the image of FIG. 8F, showing where there are sharp orientation changes in the image of FIG. 8F.

Alternative embodiments of this process can be employed. For example, the orientation data rendering in step 512 may be omitted, so that the orientation change preliminary outline 528 is calculated directly from the orientation data 522 fetched from the underlying 3D models. Contrast-enhancement processing may be optionally applied to the resulting outline.

Figure 5B:
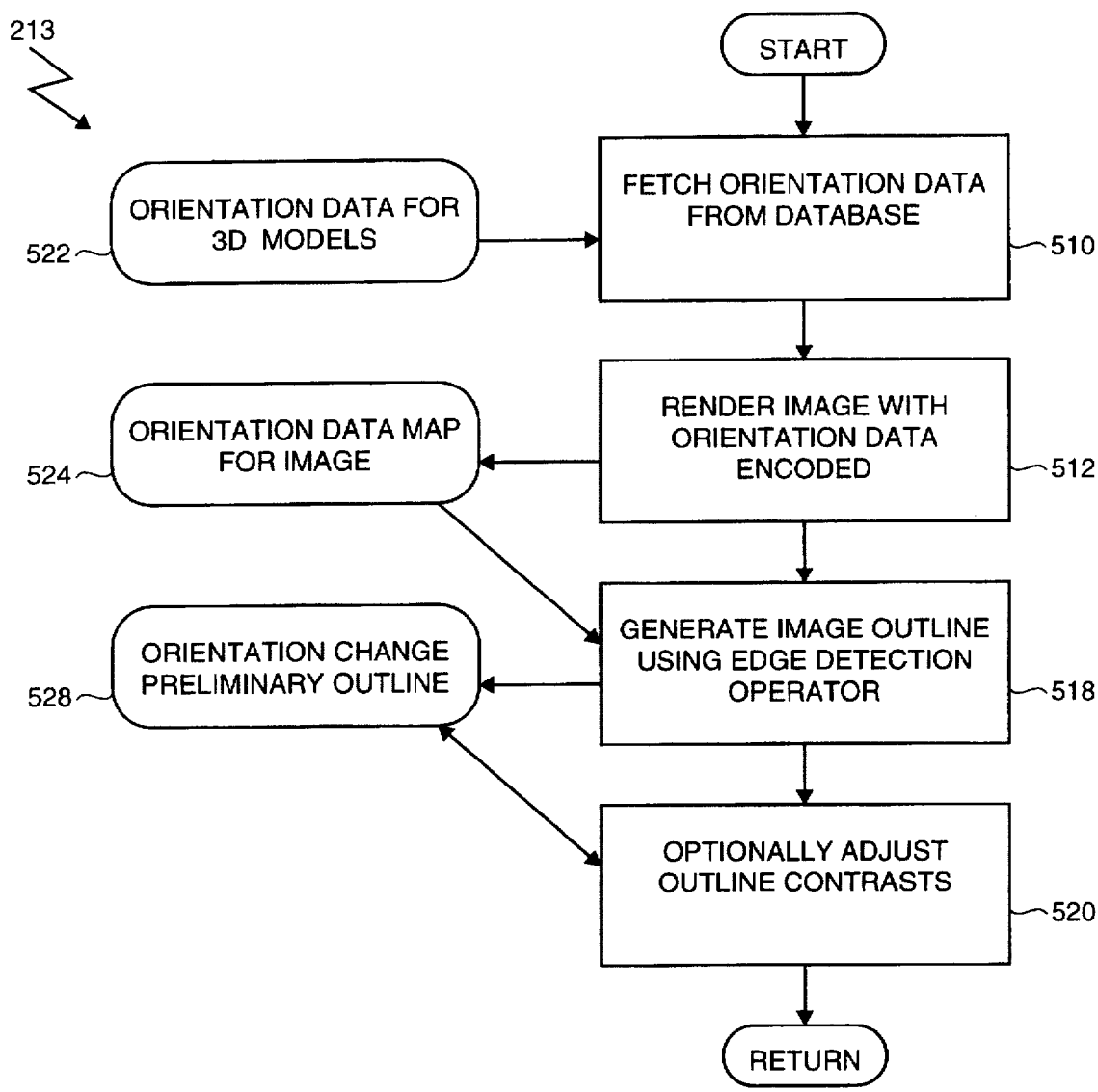
FIG. 5B is a flow diagram of another embodiment of a routine for generating a preliminary outline using orientation data from the rendered image.

Referring now to FIG. 5B there is shown a flow diagram of an alternative embodiment for generating 213 an orientation change outline 528, as may be performed by the orientation change outline generator 125. The previously stored orientation data for the 3D models in the image is retrieved 510 from the database 112. The orientation data for the model is rendered 512 into the image's array of pixels to create an orientation data map 524 of the image. Edge-detection processing 518, here based on orientation data rather than pixel data, is applied to this map to locate where there are sharp changes in orientation on the image, and thereby generate the orientation change preliminary outline 528. Conventional contrast-enhancement processing 520 may be optionally applied to this output to balance the line shades. A preliminary raster-based outline 528 that marks discrete orientation changes in the rendered image is generated when this routine is completed. FIGS. 8A, 8F, and 8G also illustrate this process as described above.

In these various embodiments of the orientation change outline generator 125, one preferred embodiment for the orientation data map 524 is a surface normal encoded map of the image, which utilizes unit surface normal vector data from the 3D model underlying the image. The surface normal encoded map is created by transforming the (dx,dy,dz) coordinate values for the unit surface normal vectors of the image to corresponding RGB triplet values. When viewed on the display 113, the surface normal encoded map is a color representation of the rendered image, with colors representing unit surface normal vectors directions.

Figure 6:
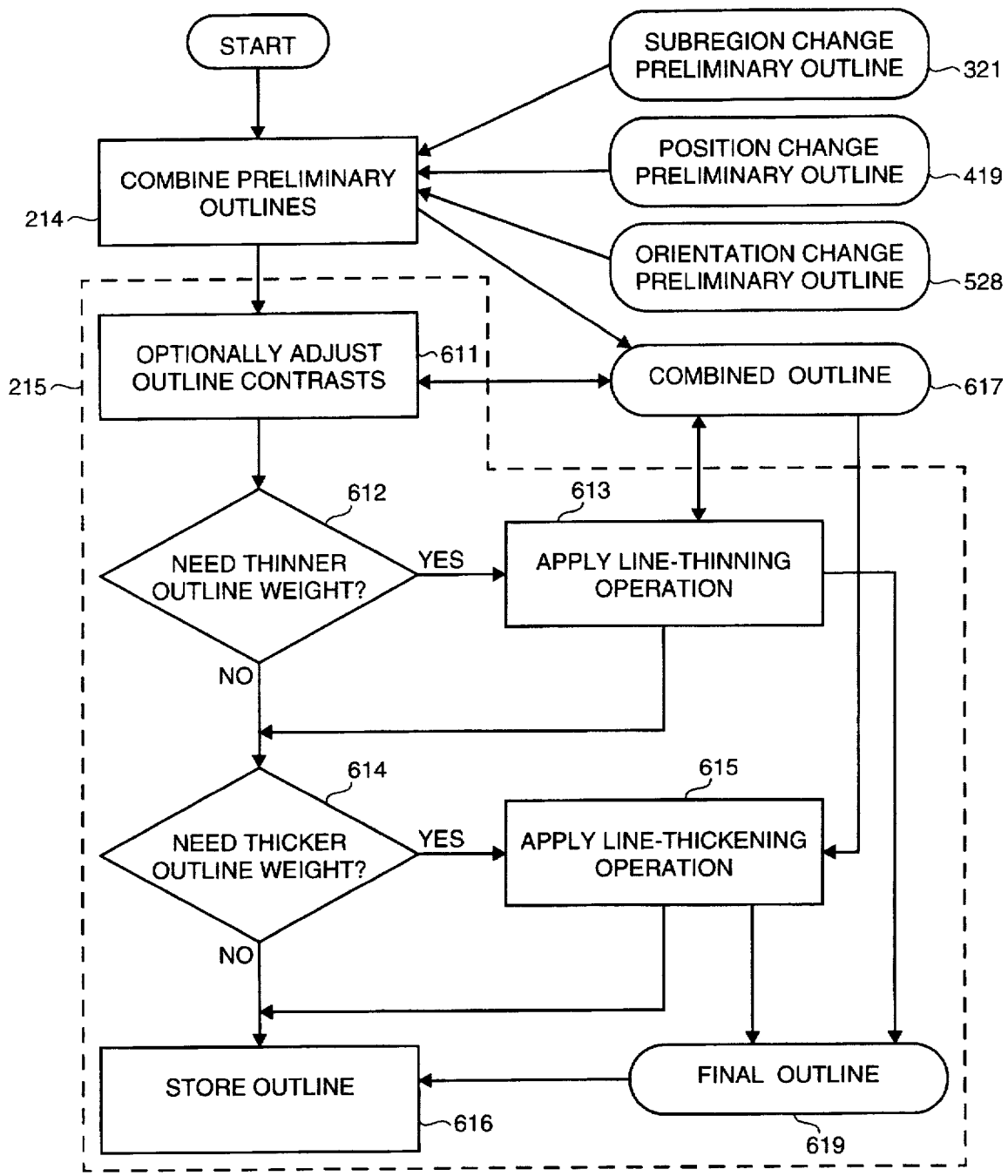
FIG. 6 is a flow diagram of a routine to combine the preliminary outlines and to refine the combined outline.

Referring now to FIG. 6 there is shown a flow diagram of the routine for generating 214, 215 (FIG. 2) the completed outline of the image. The three preliminary outlines 321, 419, and 528 are combined 214 (FIG. 6) into a single raster image 617 by the outline combiner 127.

Figure 8H:
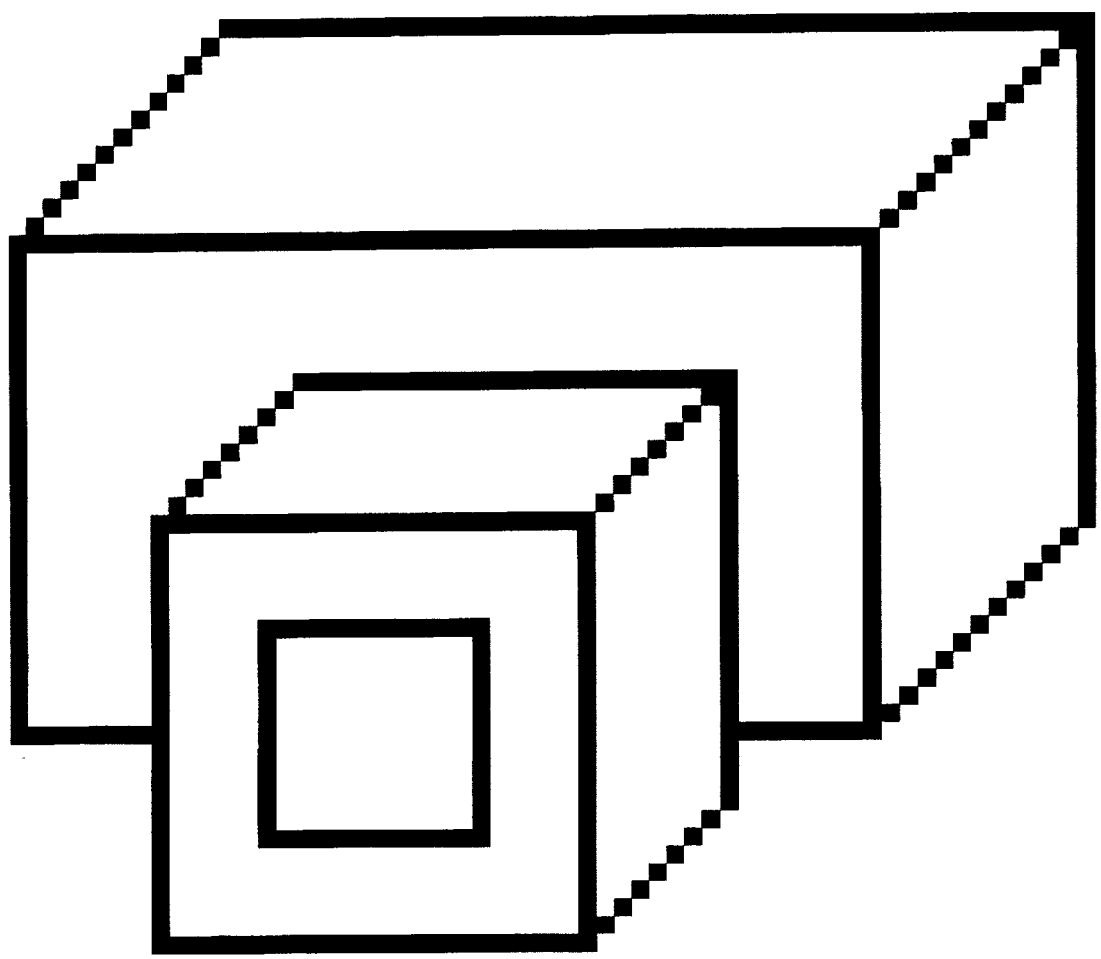
FIG. 8H is the combined outline of the outlines of FIGS. 8C, 8E, and 8G.
Figure 8I:
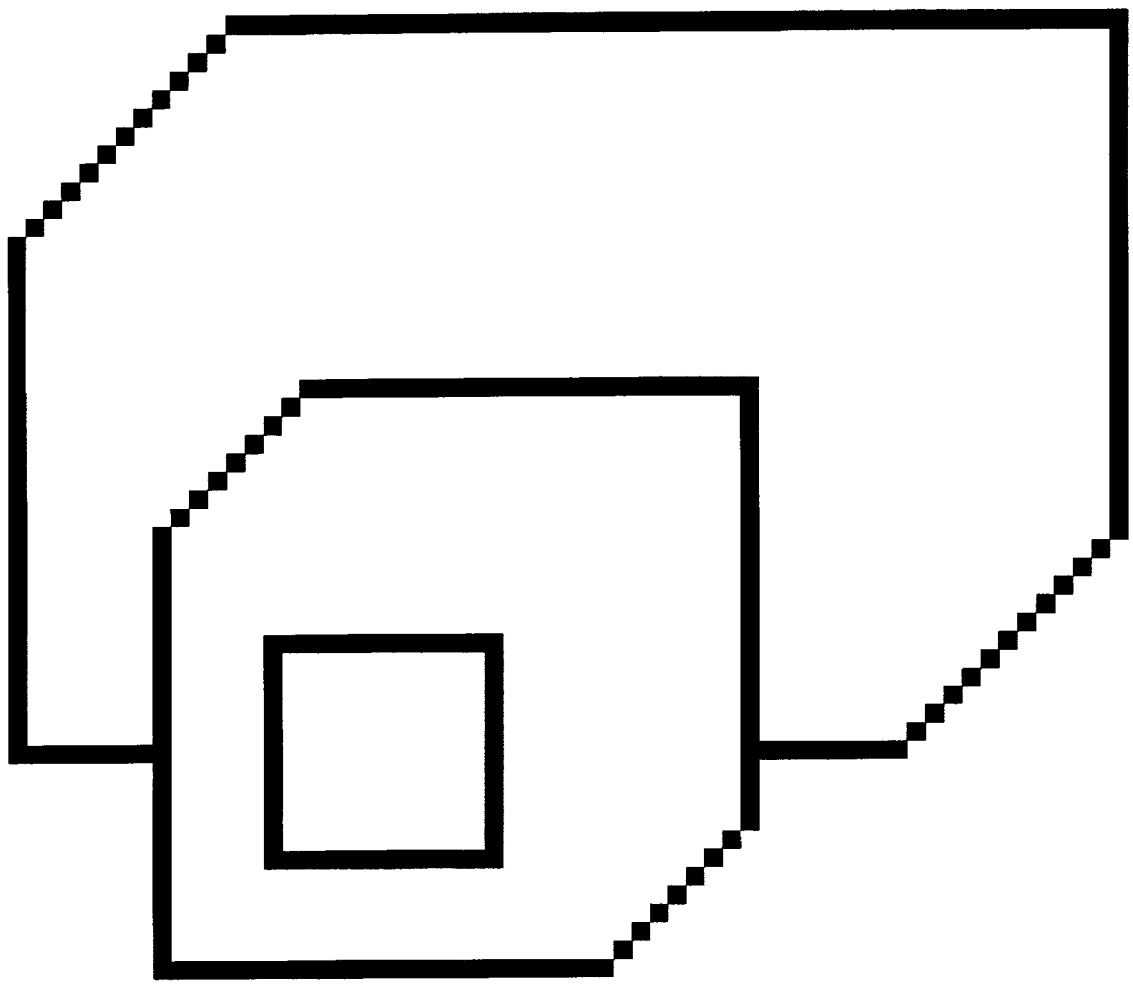
FIG. 8I is the combined outline of the outlines of FIGS. 8C and 8E.

The combination of preliminary outlines from FIGS. 8C, 8E, and 8G is shown in FIG. 8H, which is the completed outline of the rendered image of FIG. 8A. It is important to note that none of the preliminary outlines in FIGS. 8C, 8E, and 8G individually contains all of the outline information necessary to produce the outline of FIG. 8H. Further, the preliminary outlines of FIGS. 8C and 8E when combined without the orientation change preliminary outline of FIG. 8G do not produce the complete outline of FIG. 8H. This can be clearly seen by comparing the outline shown in FIG. 8I, which is the combination of FIGS. 8C and 8E, with the outline in FIG. 8H. Thus, the orientation change preliminary outline provides essential information for producing a complete outline 617 of the image.

This combined outline 617 may be useful for some applications, such as a pre-production review and concept testing and the like. However, in the preferred embodiment of the invention, the image of the combined outline 617 is run through a final processing procedure 215 to enhance the combined outline 617 with the outline refiner 129. Using the outline refiner 129, the outlined image is optionally processed 611 to balance the line shades. The outline refiner 129 also adjusts the line weight of the outline 617, with the designer or the refiner 129 determining 612, 614 if the outline is of the desired weight. If a thinner outline is desired, conventional line-thinning processing 613 is applied to the outline image (for examples of line-thinning algorithms, see Pratt, *Digital Image Processing*). To thicken the outline, conventional line-thickening processing 615 is applied to the outline. Conventional line-thickening operators include, but are not limited to, blurring, stamping, and dilation techniques (for examples, see Pratt, *Digital Image Processing*). In one embodiment, the decision to thicken or thin the outline is made by the designer viewing the combined outline 617 on the display 113, although in alternative embodiments of the invention, more automated conventional image analysis methods may be used to automatically weight the lines. Prior to the line-thinning or line-thickening operation, a thresholding operator may optionally be applied to produce a binary image.

An alternative embodiment of the line-thinning routine is to render all 70 images and generate and combine the preliminary outlines at a higher resolution, and then reduce this output to the desired resolution.

The resulting, final outline 619 is stored 616 in the database 112.

Referring back to FIG. 5A, the orientation change preliminary outline 528 generally describes the changes in orientation of the visible surfaces of the 3D models underlying the image. The orientation changes are preferably mapped as the differences in orientation between local points on the image. For a given point or pixel, the orientation change preliminary outline may be based on the difference in orientation between the given pixel and any number of nearby pixels, including those pixels not immediately adjacent to the given pixel. Nearby pixels may be defined in various ways, such as those pixels within a predetermined number of pixels, within a predetermined radius of pixels, pixels at selected distances or positions with respect to a given pixel, or the like. The orientation change preliminary outline may be computed based on maximum local orientation difference, average orientation difference, or other summary computations with respect to any nearby pixels. In the preferred embodiment, orientation data 522, for the underlying 3D models in the image, and the rendered orientation data map 524 is in the form of unit surface normal vectors.

From this data, the orientation change preliminary outline 528 tracks local angular changes between adjacent unit surface normal vectors on the image. The unit surface normal vector data is used by most renderers typically to compute lighting and shading.

Figure 7A:
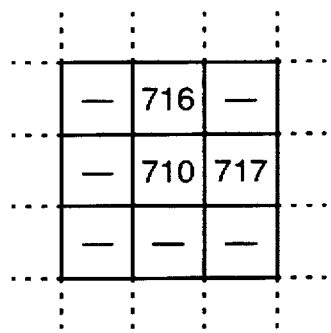
FIGS. 7A and 7B show one embodiment of an orientation change calculation technique.
Figure 7B:
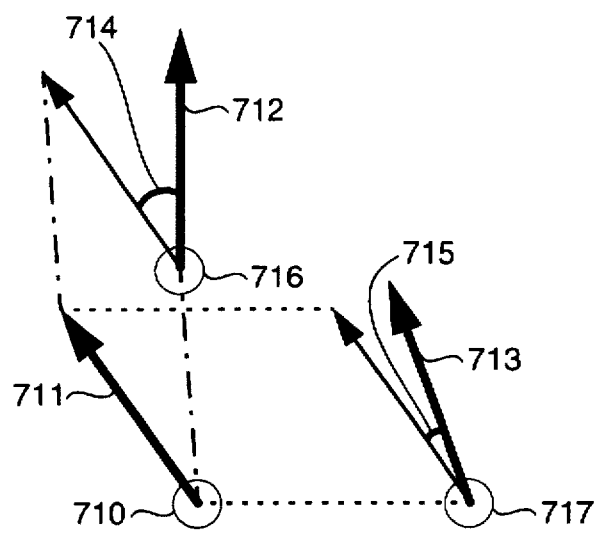

Referring to FIGS. 7A and 7B, there is shown one embodiment for determining the orientation change preliminary outline 528 (FIG. 5A), here based on maximum local orientation differences. FIG. 7A illustrates a small region of pixels on the rendered orientation data map 524 of the image (FIG. 5A), with pixels 710, 716, and 717 used for the orientation change calculation with respect to pixel 710. FIG. 7B shows the unit surface normal vectors 711, 712, and 713, for pixels 710, 716, and 717, respectively. For a given pixel 710 on the image, the angle 714 between that pixel's unit surface normal vector 711 and the surface normal vector 712 of the pixel 716 immediately above pixel 710 is measured. Likewise the angle 715 between the vector 711 and the vector 713 of an adjacent pixel 717 is also calculated. The value of the larger angle is assigned to that pixel 710 as the orientation change for the pixel, indicating the change in orientation between the pixel 710 and its neighbors. Computing the maximum angle differences for all pixels on the orientation data map 524, and storing that data in a similarly structured map or array, produces the orientation change preliminary outline 528 of the image. When viewed on the display 113, the orientation change preliminary outline 528 may be presented as a gray-scale representation of the rendered image, with shades of gray representing the angle differences between adjacent unit surface normal vectors. Outlines appear where there are discrete changes in orientation because of the large angular differences. FIG. 8G is an example of a contrast-adjusted orientation change preliminary outline for the rendered image of FIG. 8A.

This one embodiment of orientation data uses the "top" and the "right" neighbor pixels. It will be understood that many variations of this technique can be employed, for example, using other neighboring pixels, using the unit surface normal vectors for more than two neighboring pixels, or assigning a pixel's angle value by taking the difference between the given pixel's surface normal vector and the average of some number of vector angles instead of the maximum, or distinctly, the average difference between the given pixel's surface normal vector and some number of neighboring pixels' vectors.

It is expected that various other effects may be applied in conjunction with the outline generation techniques of the present invention to produce variations in the visual characteristics of the resulting preliminary outlines and combined outlines.

In summary, the present invention provides useful computer implemented methods, apparati, and software products for generating outlines of raster based, rendered images. Because the present invention operates on data routinely available from existing renders, it can be easily employed in its various embodiments without substantial modification to such systems, thereby efficiently and easily providing the hand-drawn animation style in computer based animation. Further, the present invention enables already existing computer animations to be post processed to produce the desired hand drawn style of outline, without having to re-render such animations.

I claim:

1. A computer implemented method for generating a raster-based outline for a raster-based rendered image, comprising:

creating a first preliminary outline of the rendered image from subregion data derived from the image;

creating a second preliminary outline of the rendered image from position data derived from the image;

creating a third preliminary outline of the rendered image from orientation data derived from the image; and combining the first, second, and third preliminary outlines into a combined outline.

2. The computer implemented method of claim 1, further comprising:

refining the combined outline to generate a final outline of the rendered image.

3. The computer implemented method of claim 1, wherein creating a first preliminary outline of the rendered image further comprises:

receiving user inputs assigning subregion identifiers to subregions in the rendered image;

rendering the image with subregion identifiers encoded into the subregions to generate a subregion identifier map; and detecting edges in the subregion identifier map to generate the first preliminary outline.

4. The computer implemented method of claim 1, wherein creating a second preliminary outline of the rendered image further comprises:

rendering the image with position data describing a distance of each pixel from a point of view to generate a position map of the image; and detecting edges in the position map to generate the second preliminary outline.

5. The computer implemented method of claim 1, wherein creating a third preliminary outline of the rendered image further comprises:

rendering the image with orientation data describing at each pixel in the image an orientation of the pixel to generate an orientation data map of the image;

determining from the orientation data map changes in the orientation between pixels to generate the third preliminary outline.

6. The computer implemented method of claim 5, wherein:

the orientation data is defined by unit surface normal vectors at each pixel in the image; and determining from the orientation data map changes in the orientation between pixels to generate the third preliminary outline, comprises:

determining a difference between the unit surface normal vector at the pixel and the unit surface normal vector of at least one nearby pixel.

7. The computer implemented method of claim 5, wherein:

the orientation data is defined by unit surface normal vectors at each pixel in the image; and determining from the orientation data map changes in the orientation between pixels to generate the third preliminary outline, comprises:

determining a maximum difference between the unit surface normal vector at the pixel and the unit surface normal vectors of at least two nearby pixels.

8. The computer implemented method of claim 5, wherein:

the orientation data is defined by unit surface normal vectors at each pixel in the image; and determining from the orientation data map changes in the orientation between pixels to generate the third preliminary outline, comprises:

determining a difference between the unit surface normal vector at the pixel and the average of the unit surface normal vectors of least two nearby pixels.

9. The computer implemented method of claim 1, wherein creating a third preliminary outline of the rendered image further comprises:

determining, from 3D modeling data from which the image is rendered, changes in the orientation data of pixels in the image to generate the third preliminary outline.

10. The computer implemented method of claim 1, wherein creating a third preliminary outline of the rendered image further comprises:

rendering the image with orientation data describing at each pixel in the image an orientation of the pixel to generate an orientation data map of the image; and detecting edges in the orientation data map to generate the third preliminary outline.

11. The computer implemented method of claim 1, wherein the orientation data at each pixel describes a difference in orientation between the pixel and any number of nearby pixels.

12. The computer implemented method of claim 1, wherein the orientation data is defined by unit surface normal vectors at each pixel in the image.

13. The computer implemented method of claim 1, wherein there is a unit surface normal vector for each pixel in the image, and wherein orientation data is defined at each pixel by:

transforming (dx, dy, dz) coordinate values defining a difference between the unit surface normal vector of the pixel and the unit surface normal vector of at least one pixel near the pixel, into an RGB triplet value; and encoding the RGB triplet values into a surface normal encoded map.

14. A computer readable media storing thereon a software product for controlling a processor to generate an outline of raster-based rendered image, the software product comprising:

a subregion change outline generator, executable by the processor, to generate a first preliminary outline of the rendered image from subregion data derived from the image;

a position change outline generator, executable by the processor, to generate a second preliminary outline of the rendered image from position data derived from the image;

an orientation change outline generator, executable by the processor, to generate a third preliminary outline of the rendered image from orientation data derived from the image; and an outline combiner, executable by the processor, to combine the first, second, and third preliminary outlines into a combined outline of the rendered image.

15. The computer readable media of claim 14, further comprising:

an outline refiner, executable by the processor, to refine the combined outline to generate a final outline of the rendered image.

16. The computer readable media of claim 14, wherein the orientation data at each pixel describes a difference in orientation between the pixel and any number of nearby pixels.

17. The computer readable media of claim 14, wherein the orientation data is defined by using unit surface normal vectors at each pixel in the image.

18. The computer readable media of claim 14, wherein the orientation data is defined at each pixel as a difference between the unit surface normal vector at the pixel and the unit surface normal vector of at least one pixel near the pixel.

19. The computer readable media of claim 14, wherein the orientation data is defined at each pixel as a maximum difference between the unit surface normal vector at the pixel and the unit surface normal vectors of at least two nearby pixels.

20. The computer readable media of claim 14, wherein the orientation data is defined at each pixel as a difference between the unit surface normal vector at the pixel and the average of the unit surface normal vectors of least two nearby pixels.

21. An apparatus for generating an outline of raster based rendered image, the software product comprising:

means for creating a first preliminary outline of the rendered image from subregion data derived from the image;

means for creating a second preliminary outline of the rendered image from position data derived from the image;

means for creating a third preliminary outline of the rendered image from orientation data derived from the image; and means for combining the first, second, and third preliminary outlines into a combined outline.

22. The apparatus of claim 21, further comprising:

means for refining the combined outline to generate a final outline of the rendered image.

23. The apparatus of claim 21, wherein the means for creating a third preliminary outline of the rendered image further comprises:

means for rendering the image with orientation data describing at each pixel in the image an orientation of the pixel to generate an orientation data map of the image;

means for determining from the orientation data map changes in the orientation between pixels to generate the third preliminary outline.

24. The apparatus of claim 21, wherein the means for creating a third preliminary outline of the rendered image further comprises:

means for determining, from 3D modeling data from which the image is rendered, changes in the orientation data of pixels in the image to produce the third preliminary outline of the image.

25. The apparatus of claim 21, wherein the means for creating a third preliminary outline of the rendered image further comprises:

rendering the image with orientation data describing at each pixel in the image an orientation of the pixel to generate an orientation data map of the image; and detecting edges in the orientation data map changes to generate the third preliminary outline.

* * * * *